(12) United States Patent
Marcus et al.

(10) Patent No.: US 6,624,891 B2
(45) Date of Patent: Sep. 23, 2003

(54) INTERFEROMETRIC-BASED EXTERNAL MEASUREMENT SYSTEM AND METHOD

(75) Inventors: Michael A. Marcus, Honeoye Falls, NY (US); Jiann-Rong Lee, Webster, NY (US); Donald R. Lowry, Victor, NY (US); Timothy M. Trembley, Albion, NY (US)

(73) Assignee: Eastman Kodak Company, Rochester, NY (US)

( * ) Notice: Subject to any disclaimer, the term of this patent is extended or adjusted under 35 U.S.C. 154(b) by 39 days.

(21) Appl. No.: 09/976,654

(22) Filed: Oct. 12, 2001

(65) Prior Publication Data

US 2003/0076504 A1 Apr. 24, 2003

(51) Int. Cl.[7] .................................................. G02B 9/02
(52) U.S. Cl. ........................................ 356/479; 359/497
(58) Field of Search ................................ 356/479, 497, 356/503

(56) References Cited

U.S. PATENT DOCUMENTS

| 5,596,409 | A | 1/1997 | Marcus et al. |
| 5,659,392 | A | 8/1997 | Marcus et al. |
| 5,757,485 | A | 5/1998 | Marcus et al. |
| 5,757,486 | A | 5/1998 | Marcus et al. |
| 6,075,601 | A | 6/2000 | Marcus et al. |
| 6,275,298 | B1 | 8/2001 | Marcus |
| 6,512,587 | B1 * | 1/2003 | Marcus et al. ............... 356/497 |

* cited by examiner

Primary Examiner—Frank G. Font
Assistant Examiner—Patrick Connolly
(74) Attorney, Agent, or Firm—Stephen H. Shaw

(57) ABSTRACT

An interferometric-based measurement system for externally measuring a distance between a pair of reference surfaces on an object, including: a low coherence light interferometer; an object mounting apparatus including an optical probe having an optical probe chuck; an optical fiber cable for coupling light from the interferometer to the optical probe chuck; and a computer for processing data collected by the interferometer, wherein the data is used to determine the distance between the pair of reference surfaces on the object.

9 Claims, 7 Drawing Sheets

INTERFEROMETRIC-BASED EXTERNAL MEASUREMENT SYSTEM AND METHOD

CROSS REFERENCE TO RELATED APPLICATIONS

Reference is made to commonly assigned U.S. Pat. No. 6,275,298 entitled, "METHOD FOR MEASURING A PHYSICAL DISTANCE IN A CAMERA BETWEEN TWO REFERENCE SURFACES," by Michael A. Marcus, issued on Aug. 14, 2001. This application is also related to commonly assigned U.S. Pat. No. 6,075,601 entitled, "OPTICAL PROBE CALIBRATION APPARATUS AND METHOD," by Michael A. Marcus et al., issued on Jun. 13, 2000, U.S. patent application Ser. No. 09/310,000 entitled, "OPTICAL PROBE FOR USE WITH A DIGITAL CAMERA FOR MEASURING FOCAL DEPTH," by Michael A. Marcus et al., filed on May 11, 1999, and to U.S. patent application Ser. No. 09/697,808 entitled, "MEASUREMENT METHOD AND APPARATUS OF AN EXTERNAL DIGITAL CAMERA IMAGER ASSEMBLY," by Michael A. Marcus et al., filed on Oct. 27, 2000.

FIELD OF THE INVENTION

The present invention relates generally to an optical probe assembly, particularly an external optical probe assembly for use in determining a physical distance in a camera between two reference surfaces.

BACKGROUND OF THE INVENTION

To capture an image of an object using a camera, an image beam is directed through a lens and onto an image-forming medium disposed at an image plane. In conventional photography, photographic film is disposed at the image plane and the image of the object is captured on photographic film. In electronic photography, an imager or image sensor (e.g., a Charge Coupled Device (CCD), or Complementary Metal Oxide Semiconductor (CMOS)), is disposed at the image plane, and the image of the object is captured electronically. For both conventional and electronic photography, it is necessary to properly position the image plane and the lens within the camera, relative to each other, to provide a focused image.

Commonly assigned U.S. Pat. No. 5,757,485, entitled, "DIGITAL CAMERA IMAGE SENSOR POSITIONING METHOD INCLUDING A NON-COHERENT INTERFEROMETER," by Michael A. Marcus, et al., issued on May 26, 1998; and U.S. Pat. No. 5,757,486, entitled, "DIGITAL CAMERA IMAGE SENSOR POSITIONING APPARATUS INCLUDING A NON-COHERENT LIGHT INTERFEROMETER," by Michael A. Marcus, et al., issued on May 26, 1998, relate to a digital camera image sensor positioning apparatus and method which includes a non-coherent light interferometer. The apparatus and method include an optical probe assembly that is removable and that can be mounted to a digital camera. Before mounting the optical probe assembly into the camera, the camera's shutter must be first opened by actuating the camera's electronics. A low coherence light interferometer is in communication with the optical probe assembly to determine a depth from a reference surface to the image surface and optical probe assembly.

The low coherence light interferometer can aid in measuring the exacting manufacturing specifications required for properly positioning image sensors like CCDs and CMOS image sensors. The steps in a CCD based imager manufacturing process are as follows. For a conventional CCD manufacturing process, multiple CCD imager arrays are processed together on a single silicon wafer. Imager dies, composed of a single CCD imager array, are diced from the wafer, positioned, and glued into specially designed packages. A flat transparent plate called the imager cover glass is then glued into the specially designed package at a location that is offset from the imager die to hermetically seal the specially designed package. This hermetically sealed package containing the imager die is then mounted into a camera mounting plate that includes a reference plane to facilitate proper mounting of the image sensor into the camera. The camera itself will include a camera reference plane that receives the camera mounting plate from the imager package. In a film camera, film rails usually define the camera reference plane. Optionally, the package can include the camera mounting plate and reference plane, which obviates mounting the hermetically sealed package into a camera mounting plate.

In order to ensure that the CCD is positioned properly in the camera, the exact location of the CCD needs to be determined. The CCD location can be determined relative to a reference surface or reference plane.

A Coordinate Measuring Machine (CMM) is an example of an apparatus employed to determine the location of an object relative to a reference plane. Conventionally, the object is retained in a suitable holder on an optical bench. In one method to determine the location of an object, three points on a reference plane, approximately 120 degrees apart, are measured to define the reference plane; the coordinates of the three points are tracked in the x, y and z directions. A point on the object is then measured relative to the reference plane, and the distance from the reference plane is calculated. Conventional CMMs have contact probes for intimately contacting each of the points defining the reference plane and the object.

Another technology known as low-coherence light interferometry has also been used to measure physical properties of an object. U.S. Pat. No. 5,659,392, entitled "ASSOCIATED DUAL INTERFEROMETRIC MEASUREMENT APPARATUS FOR DETERMINING A PHYSICAL PROPERTY OF AN OBJECT," by Michael A. Marcus, et al., issued Aug. 19, 1997, and U.S. Pat. No. 5,596,409, entitled, "ASSOCIATED DUAL INTERFEROMETRIC MEASUREMENT METHOD FOR DETERMINING A PHYSICAL PROPERTY OF AN OBJECT," by Michael A. Marcus, et al., issued Jan. 21, 1997, disclose an associated dual interferometric apparatus and method for measuring physical properties of an object, such as thickness, group index of refraction, and distance to a surface. U.S. Pat. No. 5,757,485 and U.S. Pat. No. 5,757,486, disclose a digital camera image sensor positioning apparatus and method which includes a low-coherence light interferometer. The apparatus and method include a removable optical probe assembly mounted to a digital camera. The low-coherence light interferometer is in communication with the optical probe assembly to determine a depth of an image sensor residing within a digital camera, relative to a reference surface. U.S. Pat. No. 6,075,601 describes an optical probe calibration apparatus used for calibrating the optical probes used in U.S. Pat. Nos. 5,757,485 and 5,757,486 referenced above. These three aforementioned U.S. patents require that the optical probe be mounted in the camera body in order to determine the location of the imager sensor with respect to the camera reference surface.

Therefore, a skilled operator is required to install the image sensor in the camera and subsequently assemble the camera, before finding out if the image sensor is properly focused. Several steps are required, including securing the image sensor with 3 or 4 screws onto the camera mounting plane, and inserting a measurement optical probe into the camera body and locking the probe into the lens flange mounting ring before a measurement can be initiated. Before mounting the measurement optical probe into the camera body, the camera electronics has to be turned on and the electronic shutter opened. Full camera assembly and substantial skilled operator intervention are required before an assessment of image sensor focus can be made. If the image sensor is out of focus, the camera is disassembled and the image sensor is replaced. In order to calibrate the measurement optical probe, an external calibration fixture is also required.

While internal apparatus and methods may have achieved a certain level of success, the internal apparatus is not readily transportable nor simple to use. Further, the methods are time consuming and quite often are dependent on the skill of the operator.

Accordingly, a need continues to exist for a simplified, user-friendly apparatus and method for determining the position of an image sensor in a digital camera. Furthermore, there is a need to properly predict the position of an image sensor before permanently physically mounting the image sensor inside the digital camera. The apparatus needs to be robust, transportable, and simple to use. The method must be fast, provide objective results independent of the operator, and provide accurate and consistent results.

In particular, for SLR cameras configured for use with 35 mm photographic film or APS format film, a need continues to exist for rapidly measuring a distance between a lens mounting member of the camera and film rails disposed at the image plane. Such a measurement assists in the determination of whether the SLR camera is within manufacturing specifications.

SUMMARY OF THE INVENTION

The aforementioned need is met according to the present invention by providing an interferometric-based measurement system for externally measuring a distance between a pair of reference surfaces on an object, that includes: a low coherence light interferometer; an object mounting apparatus including an optical probe having an optical probe chuck; an optical fiber cable for coupling light from the interferometer to the optical probe chuck; and a computer for processing data collected by the interferometer, wherein the data is used to determine the distance between the pair of reference surfaces on the object.

Another embodiment of the present invention provides an interferometric-based external measurement system for determining whether a distance between a measurement camera's lens flange mounting ring and a camera's second reference surface meets predetermined dimensional specifications, that includes: a low coherence light interferometer; a camera mounting apparatus, including an optical probe having an optical probe chuck; an optical fiber cable for coupling light from the interferometer to the optical probe chuck; and a computer for processing data collected by the interferometer, wherein the data is used to determine whether the predetermined dimensional specifications are met.

Yet another embodiment of the present invention provides a method for externally calibrating an apparatus that measures a physical distance in a camera between a first reference surface on the camera and a second reference surface (LFu) on the camera, the first reference surface being substantially parallel to the second reference surface including the steps of: a) mounting the first reference surface of a reference camera with a known distance LFr onto a measurement apparatus that includes an optical probe with an optical probe reference surface R, and an adjustable height measurement flat; b) clamping to mate the adjustable height measurement flat to the second reference surface of the camera (F); and c) determining a distance RBr with a low-coherence light interferometer, where RBr is defined as the distance from the optical probe reference surface R to a second planar parallel surface of the adjustable height measurement flat (B).

Advantages

The present invention provides a method for determining a physical distance in a camera between two reference surfaces. The method is robust, transportable, simple to use, and can be readily used with both a digital camera and a film camera.

DETAILED DESCRIPTION OF THE INVENTION

Figure 1:
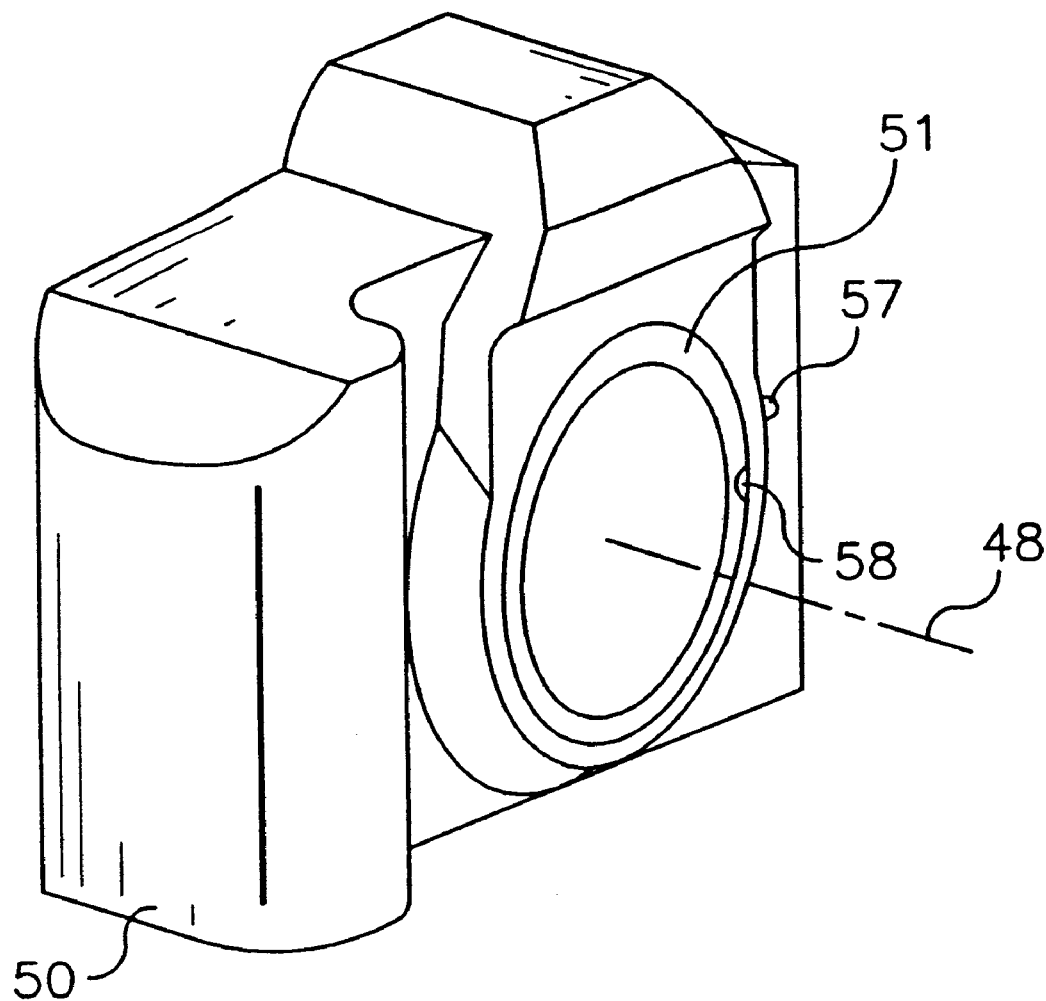
FIG. 1 shows a prior art view of a camera body showing the lens mounting reference surface.

The distance from the camera mounting ring to the reference surface in the optical probe's external calibration fixture is better suited for measurement with an external technique, such as provided by a CMM machine. In one embodiment of the present invention, a measurement system has been developed for measuring the distance between a camera's lens flange mounting ring and the film rails, which does not require opening of the camera shutter to perform the measurement. A stationary optical probe has been constructed facing downward and mounted a fixed distance from a camera lens flange mounting ring on a stationary platform or on a movable adjustable slide platform containing multiple types of lens flange mounting rings. A thick flat plate is placed on the film rails of a test camera body or a reference body and spring loaded clamps are used as tensioning members to reproducibly position the thick measurement plate onto the camera film rails.

Prior art measurements of the distance between the lens flange mount and the film rail plane in a camera requires CMM measurement or using the non-coherent light interferometer with an internally installed optical probe. The present invention's major improvement is that the shutter does not need to be opened so that a camera body without any electronics can be tested. Combining this test with a die to plate measurement allows one to predict the focus position of the imager in a camera very accurately. When coupled with an external measurement of the position of the image sensor plane with respect to its camera mounting plate the focus position of the imager in a camera can be accurately determined before it is mounted into the camera body.

In another embodiment of the present invention, a lens mounting ring is mounted facing vertically. A constant height ball slide is present to facilitate mounting and de-mounting of the test camera and to allow for the possibility of using different types of camera mounting rings with a single optical probe. As an example, Nikon and Canon have different types of lens flange mounting rings. The test camera or reference camera is mounted onto the lens flange mounting ring with the camera mounting ring to the side. The thick plate is then put into place using the film rail mounting pins as guides. The optical probe and lens mounting ring equivalent are then centered with respect to each other and locked in place with a center axis locating pin located adjacent to the bottom ball slide stage. Measurement of the plate top surface to probe reference surface by non-coherent light interferometry is then utilized to measure film rail distance. A reference camera body of known film rail dimensions is used to calibrate the measurement system.

A stationary probe apparatus, referred herein as an imager mounting apparatus, has been developed which includes an optical probe permanently mounted at a constant distance from a reference plane designed to mimic the function of the imager mounting plane in a digital camera. The optical probe has a pellicle reference plane built into it, which is used as a reference surface to calculate distances. Preferably, the pellicle reference plane is the surface of a thick, glass, optical flat that faces the imager assembly in the probe mount. This allows one to assess the imager focus location with respect to an ideal focus without the need of inserting the optical probe into a camera body. The stationary fixture, with the permanently mounted optical probe, also secures the imager mounting plate in place with a simple clamping means, thus eliminating the need to use screws which add to assembly time. In order to calibrate the apparatus, an optically flat plate is installed into the same apparatus to determine the distance from the optical probe pellicle reference plane to the plane in the same apparatus that the imager mounting plate is clamped to. Thus, no external apparatus is needed to calibrate the optical probe.

FIG. 1 shows a conventional SLR type camera. A camera lens 48 is generally mounted to the camera body 50 at the lens flange mounting ring 51. Conventional means (not shown) are known to facilitate mounting of the lens 48 to the camera body 50. Such means may include: a screw lens mount wherein screw threads allows installation of the lens 48 to the camera body 50; a bayonet lens mount wherein the lens is placed in keyed-contact and rotated over a mating flange on the camera body 50 with a twist of about 45 degrees; or a breech lock lens mount wherein a knurled collar on the back of the lens 48 fits over a mating flange on the camera body 50. To secure the mounting, the lens mount may include a locking means 58 to lock the lens 48 to the lens flange mounting ring 51. Similarly, to unlock the lens 48 from the lens flange mounting ring 51, an unlocking means 57 may be included.

Figure 2:
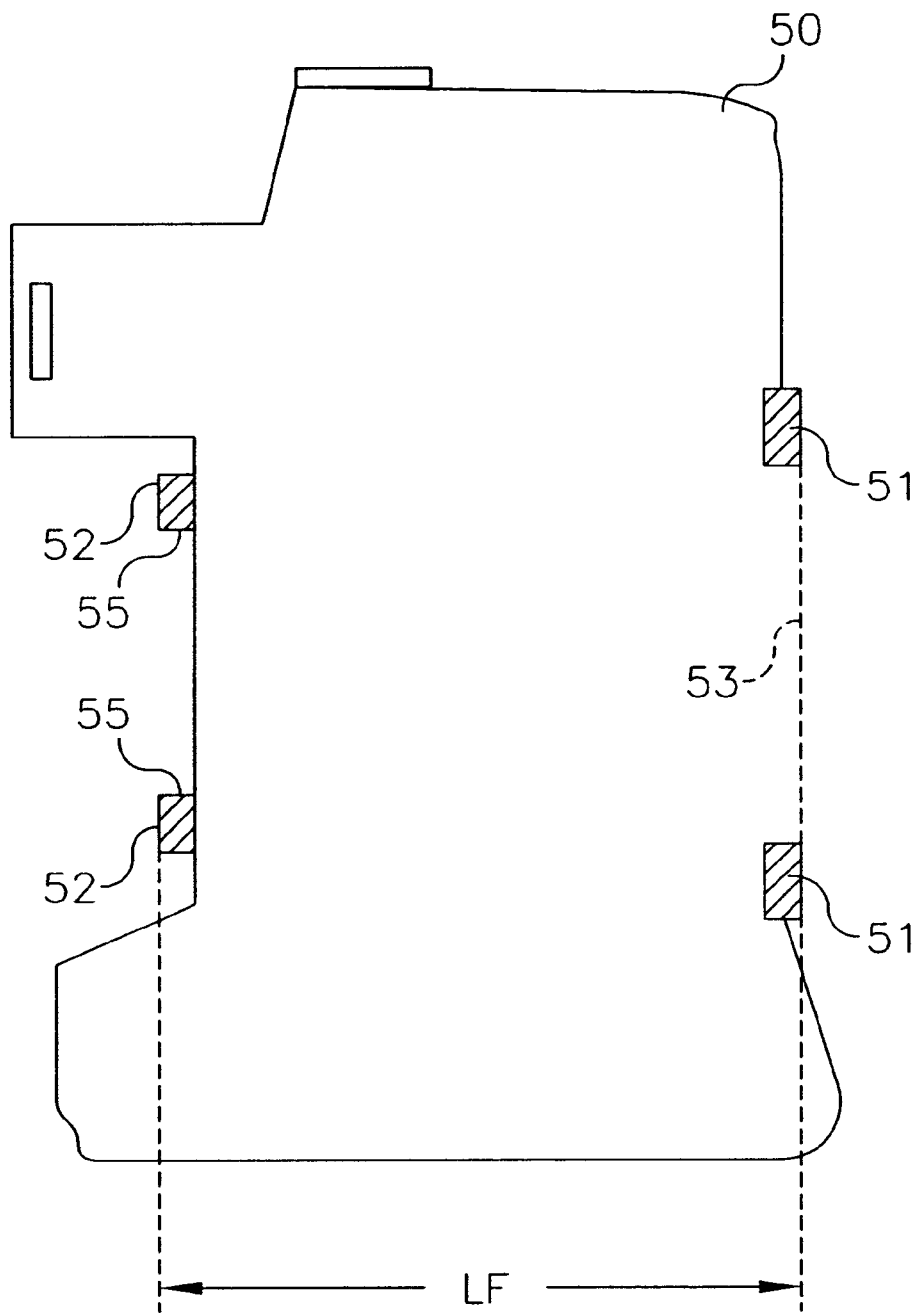
FIG. 2 shows a prior art schematic side view of a camera body with a camera mounting reference surface and a lens flange mounting ring for attaching a lens to the camera body.

FIG. 2 shows a prior art schematic side view of a camera body 50 with a camera mounting reference structure 55 with a camera reference plane defined as the second reference surface 52 and a lens flange mounting ring 51 with first reference surface 53 for mounting camera lenses to the camera body 50. In general, the first reference surface 53 is substantially parallel to the second reference surface 52, and the distance from the first reference surface 53 to the second reference surface 52 is defined as LF.

In order to properly focus film or a digital image sensor when mounted into a camera body the film or image sensor must be located at a defined distance from the lens flange mounting ring within a design tolerance. In the manufacture of precision cameras such as SLR cameras, the distance LF needs to be tightly controlled.

Figure 3:
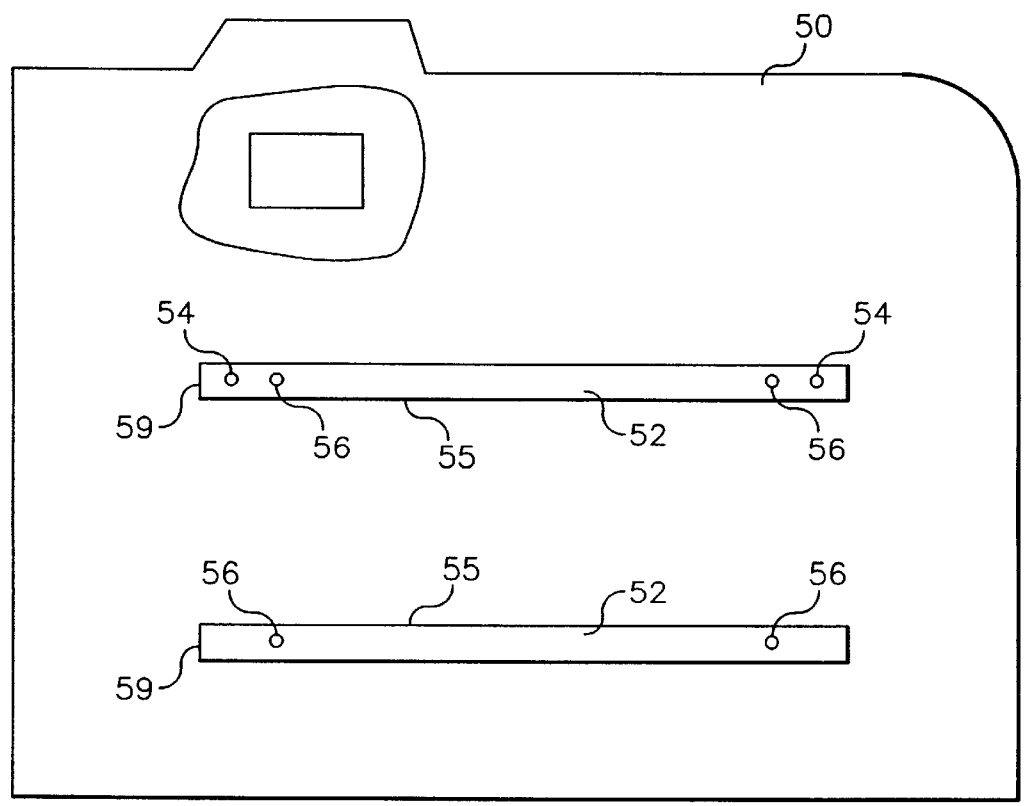
FIG. 3 shows a prior art schematic view of the film rail of a conventional film camera.

FIG. 3 shows a prior art schematic back view of a camera body 50 with a camera mounting reference structure 55 with a second reference surface 52 for mounting an imager assembly (not shown). In a film camera the camera reference structure 55 ordinarily includes a pair of camera film rails 59. Also shown in FIG. 3 are camera threaded holes 56 and the camera alignment pin receiver holes 54 in the camera reference structure 55 for mounting the imager assembly. Preferably, one of the camera alignment pin receiver holes 54 is slotted in order to facilitate mounting of an imager assembly to the camera body 50.

Figure 4:
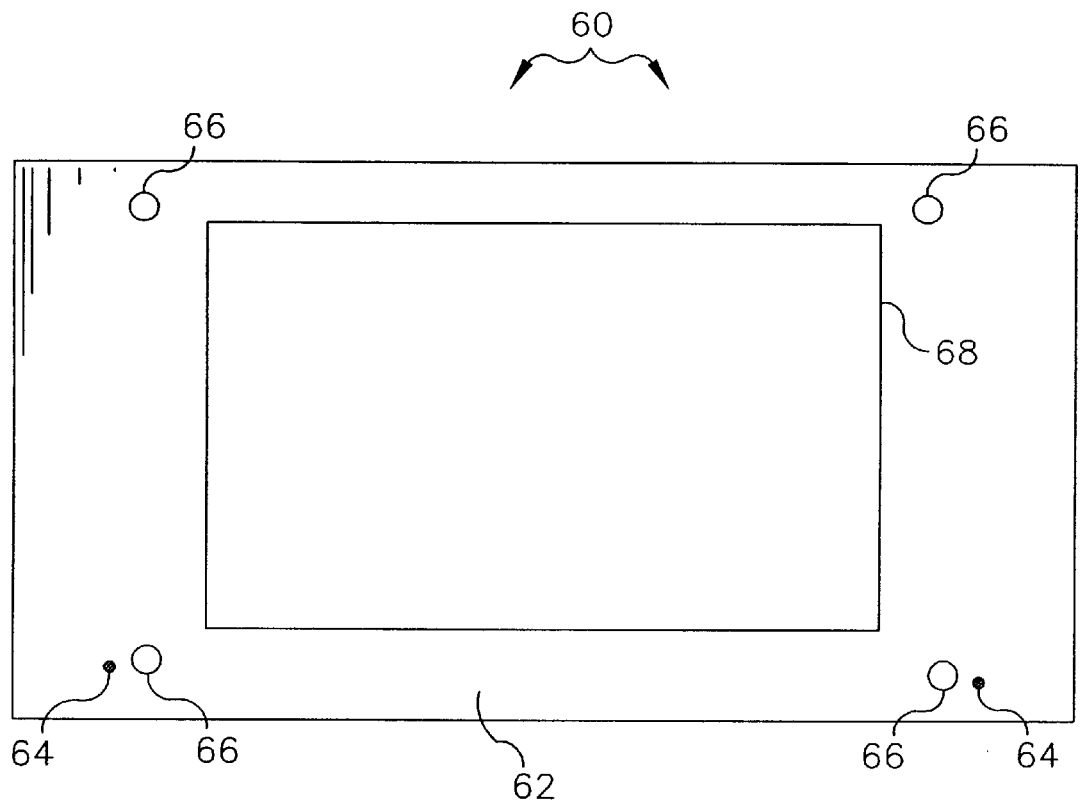
FIG. 4 shows a prior art schematic view of a digital imager camera mounting plate.

FIG. 4 shows a plan view of a prior art imager camera mounting plate 60 disclosing the reference features adapted to cooperate with alignment features in the camera body 50 of FIG. 3, and that enables positioning an image sensor (not shown) at a predetermined focal plane once mounted inside the camera body 50. Usually, the predetermined focal plane is measured with respect to the first reference surface 53 of the lens flange mounting ring 51 (shown in FIG. 3) of the camera body 50. Also shown in FIG. 4 are the camera mounting plate reference surface 62, mounting holes 66, alignment pins 64 and an image sensor cutout 68.

U.S. application Ser. No. 09/697,808, entitled, "MEASUREMENT METHOD AND APPARATUS OF AN EXTERNAL DIGITAL CAMERA IMAGER ASSEMBLY," by Michael A. Marcus, et al., Filed Oct. 27, 2000, describes the mounting process for placing an imager into imager sensor cutout 68 shown in FIG. 4. When placing imager camera mounting plate 60 into a digital camera back such as that shown in FIG. 3, second reference surface 52 is aligned with camera mounting plate reference surface 62 as follows: Alignment pins 64 are installed in camera alignment pin receiver holes 54 which cause mounting holes 66 to automatically align with camera threaded holes 56. The imager assembly is secured to the camera body 50 with screws (not shown) placed in the imager camera mounting plate 60 through mounting holes 66 and are threaded into the camera threaded holes 56.

Figure 5:
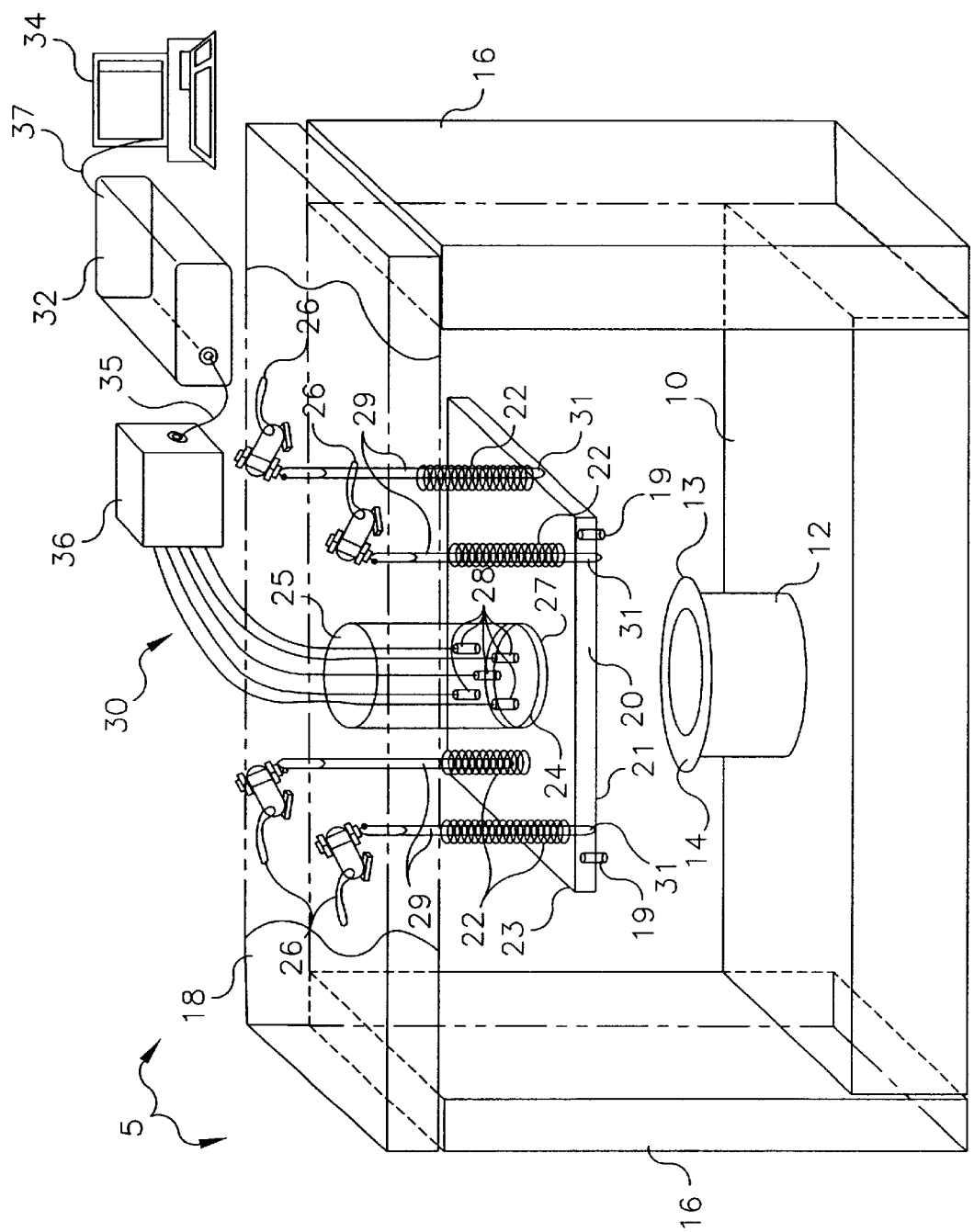
FIG. 5 shows a schematic of the measurement apparatus of the present invention.

FIG. 5 shows a schematic of the camera reference surface distance measuring system 5 used during the practice of this invention. The measuring system 5 includes an optical interferometer 32; a computer 34 with A-D converters and data acquisition and control capability for passing interferometer control parameters and collecting interferometric data through data transmission cable 37 from the interferometer 32 to the data acquisition boards in computer 34; an optical multiplexer 36; and a multitude of optical fibers 30 which connect between optical multiplexer 36 and optical probe chucks 28. The camera reference surface distance measuring system 5 also includes a primary mounting base 10 which preferably sits on a table; main supports 16 which fasten to the primary mounting base 10; a camera mounting base cylinder 12 fastened to the primary mounting base 10;

and a measurement apparatus lens mounting ring 14 at the top end of the camera mounting base cylinder 12 with a measurement apparatus lens flange mounting surface 13. An optical probe mounting base 18 is attached to the top of the main supports 16. The optical probe mounting base 18 is used to hold the optical probe 25 in a fixed position.

Figure 6:
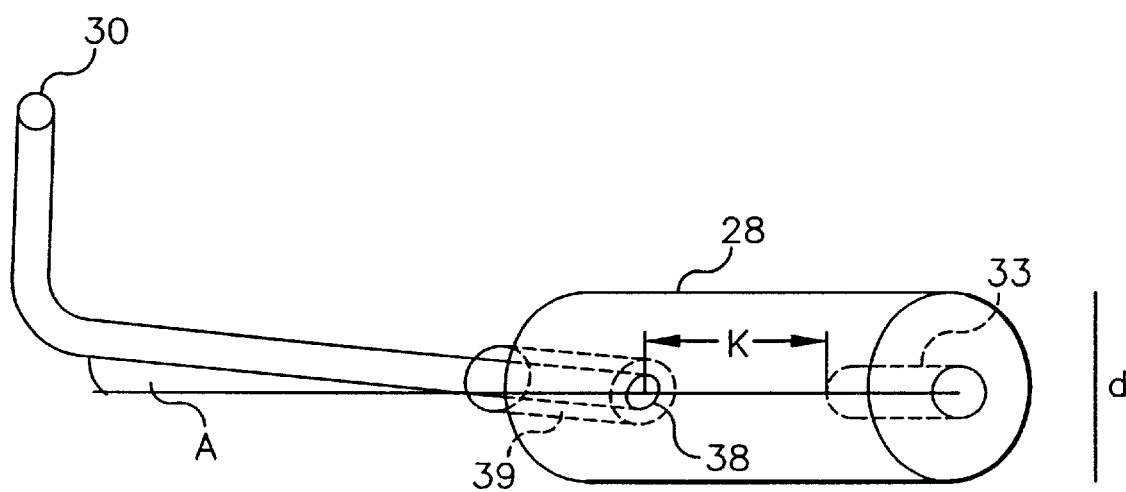
FIG. 6 shows a schematic detailing the optical chuck of the measurement apparatus.

The optical probe 25 also includes individual optical probe chucks 28 details of which are described in FIG. 6, an optical probe integrated reference flat 24 with an optical probe reference surface 27.

The optical probe mounting base 18 also supports an adjustable height measurement flat 20 using clamps 26 rigidly attached to measurement flat height adjustment rods 29 which are mounted through holes (not shown) in the optical probe mounting base 18. These measurement flat height adjustment rods 29 are also rigidly attached to the adjustable height measurement flat 20, and terminate at their adjustment rod tips 31. Tensioning springs 22 surround the measurement flat height adjustment rods 29 between the optical probe mounting base 18 and the adjustable height measurement flat 20. The clamps 26 have two locking positions, at the highest height and at the lowest height of measurement flat 20. The measurement flat 20 has a first planar parallel surface 21 and a second planar parallel surface 23 which are used during the measurement process.

FIG. 6 shows details of the optical probe chuck 28. Optical fiber 30 is terminated in an angled fiber ferrule 39 such as an APC/FC ferrule. The optical fiber 30 is terminated in an angled fiber tip 38 typically about 8 degrees from the normal, which is utilized to eliminate back reflections from the ends of the optical fiber 30 and the lens surfaces. A hole (not shown) is drilled in the optical probe chuck 28 at angle A to receive the angled fiber ferrule 39 and to ensure that the center of the angled fiber tip 38 is located at the center axis of the optical probe chuck 28 of diameter d. The angled fiber ferrule 39 is installed in the optical probe chuck 28 using set screws (not shown). A gradient index lens (GRIN) lens 33 is installed on the center axis at the other end of the optical probe chuck 28. The distance from the angled fiber tip 38 to the front surface of GRIN lens 33 defined as length K determines the focal length of the lens 33 and the depth of focus. This distance K is set so that the optical probe reference surface 27 and the second planar parallel surface 23 of adjustable height measurement flat 20 are both in focus at the normal measurement distances when a measurement camera is installed in the camera reference surface measurement system 5.

For operation of the measurement system 5, shown in FIG. 5, a camera body 50 is mounted as follows: The clamps 26 are set to their upper position to lift the adjustable height measurement flat 20 to its highest position to enable installation of a camera body 50 into the measurement apparatus lens mounting ring 14. The lens flange mounting ring 51 of camera body 50 is installed into the measurement apparatus lens mounting ring 14 and rotated into place while pressing the locking means 58 of camera body 50. The clamps 26 are then pressed to their lowest and locked position to force the adjustable height measurement flat 20 down to its lowest position so that its first planar parallel surface 21 is coincident with the second reference surface 52. When the clamps 26 are lowered to their lowest and locked position, alignment pins 19 fit into camera alignment pin receiver holes 54 and adjustment rod tips 31 align with camera threaded holes 56. This ensures that the first planar parallel surface 21 is coincident with the second reference surface 52 when a camera body 50 measurement is performed utilizing the apparatus shown in FIG. 5.

An alternative embodiment to the apparatus shown in FIG. 5 is as follows: The adjustable height measurement flat 20 could be placed on the camera body 50 as a separate piece. The adjustment rod tips 31 of measurement flat height adjustment rods 29 would be modified to hold tensioning springs 22 in place. The adjustable height measurement flat 20 would also include holes (not shown) for receiving the adjustment rod tips 31 when the clamps 26 are lowered to the lowest and locked position.

Figure 7B:
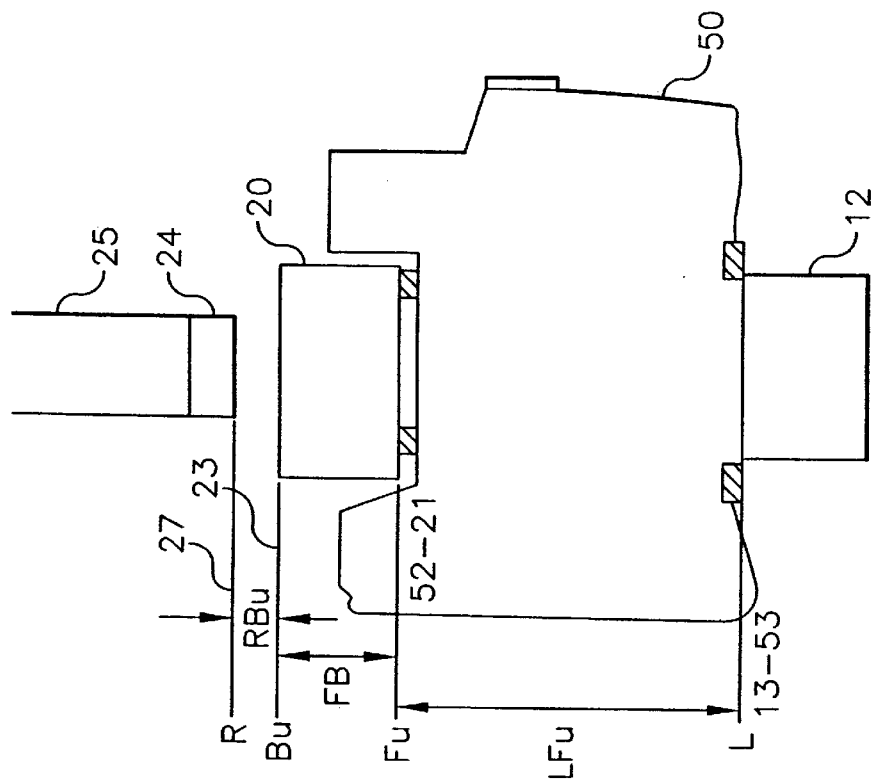
FIG. 7B shows the measurement geometry used in performance of the invention, specifically the measurement of a camera body.
Figure 7A:
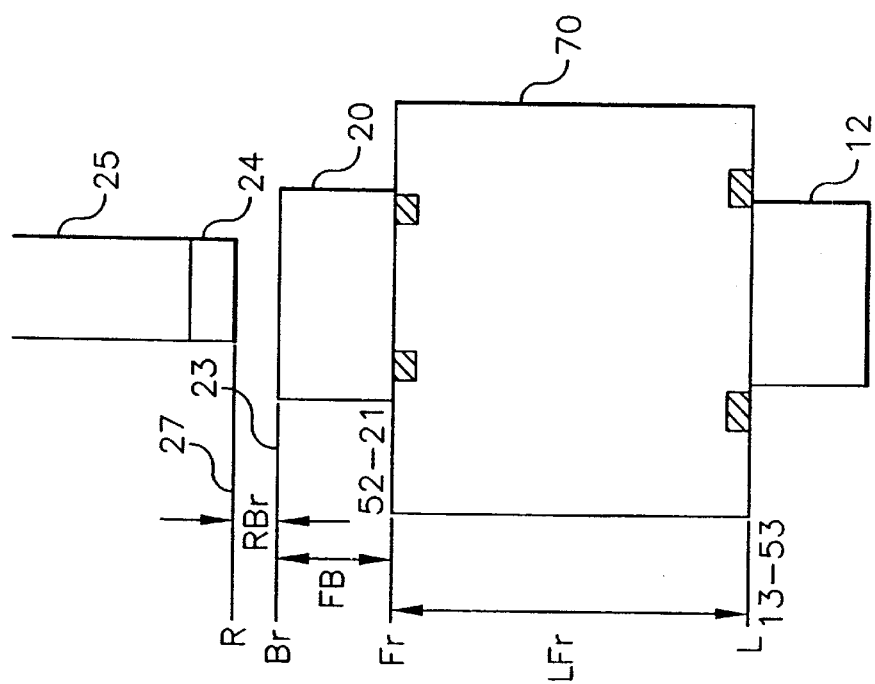
FIG. 7A shows the measurement geometry used in performance of the invention, specifically the measurement of a reference body.

FIGS. 7A and 7B show the measurement geometry when performing measurements using the camera reference surface distance measuring system shown in FIG. 5. FIG. 7A shows the measurement geometry for a reference body 70 installed in the measurement system 5 and FIG. 7B shows the measurement geometry for a camera body 50 installed in the measurement system 5. The numbered items in FIGS. 7A and 7B refer to the corresponding elements shown in FIG. 5. The reference body 70 has known dimensions between the first reference surface 53 and the second reference surface 52 defined as LFr. The distance LFr has been measured by an external technique such as a CMM machine or by the method described in U.S. Pat. No. 6,275,298. Referring to FIG. 7A, the reference body 70 can either be a camera or a structure with mating surfaces that mimic the mating surfaces of a camera body. Surface L is the coincidence of the measurement apparatus lens flange mounting surface 13 and the first reference surface 53. Surface Fr is the coincidence of the second reference surface 52 and the first planar parallel surface 21 of the adjustable height measurement flat 20. Surface Br is the second planar parallel surface 23 of the adjustable height measurement flat 20. Surface R is the optical probe reference surface 27 of the optical probe integrated reference flat 24.

The relationships for measuring the various surfaces shown in FIG. 7B follow the same rules as described with respect to the discussion of FIG. 7A. In FIG. 7A, the distance LFr is defined as the distance from surface Fr to surface L of the reference body 70. In FIG. 7B, the distance Lfu is defined as the distance from surface Fu to surface L of the unknown measurement camera body 50. Distance FB is the distance from surface B to surface F in both figures, and RBr is the distance from surface R to surface Br of FIG. 7A; whereas, RBu is the distance from surface R to surface Bu of FIG. 7B. Since distance FB is the thickness of the adjustable height measurement flat 20, as shown in both figures, and has a constant value, then FuBu=FrBr=FB. Since surface R and surface L are both attached to the measurement apparatus the total distance RL is also a constant. The relevant measurement relationships are as follows. For the reference body 70 the relationship is $$RL = RBr + FB + LFr \qquad \text{Equation (1)}$$

For the unknown measurement camera body 50 the relationship is $$RL = RBu + FB + Lfu \qquad \text{Equation (2)}$$

Hence, $$LFu = RBr + LFr - RBu \qquad \text{Equation (3)}$$

When performing the measurement utilizing the measurement system 5 shown in FIG. 5, first, the reference body 70 is measured utilizing low coherence light interferometry to determine the distance RBr of FIG. 7A. Once known this distance can be used as a measured constant and can be measured on an infrequent basis to check out instrument calibration. Next, the unknown measurement camera body 50 is mounted into the measurement system 5 and low coherence light interferometry is utilized to measure the distance RBu of FIG. 7B. The distance LFu, as shown in FIG. 7B representing the distance from the first reference surface 53 to the second reference surface 52, is then calculated from the relationship shown in Equation 3.

Usually there is a predetermined camera body dimensional specification, which includes a maximum variation allowed (tolerance limit) in camera body dimensions from a nominal value. By comparing the measured value of LFu to the tolerance limit one can determine whether the dimensions of camera body 50 meets one's required specification.

During a measurement, light from a low-coherence source (not shown) inside the optical interferometer 32 is sent to the optical multiplexer 36 via interferometer single mode fiber cable 35 (see FIG. 5). The optical multiplexer 36 is used to switch between different measurement locations on the image sensor's surface. This is done by switching the optical connection inside the multiplexer 36 between the various single mode optical fibers 30 attached to the back of optical multiplexer 36 which are coupled to the individual optical probe chucks 28 of optical probe 25 which define the individual measurement locations on the surface of the second planar parallel surface 23 of the adjustable height measurement flat 20. During a measurement sequence, each of the optical probe chuck locations 25 are measured and analyzed in a defined sequence.

The optical probe 25 is defined as having an optical probe reference surface 27 on the optical probe integrated reference flat 24. The preferred optical probe reference surface 27 is the bottom surface of a thick glass optical flat. During a measurement, the interferometer 32 is scanned a distance sufficient to measure the distance between the optical probe reference surface 27 and the second planar parallel surface 23 of adjustable height measurement flat 20. This distance is equivalent to the distance RBx defined above.

Although the system and method have been described with respect to measuring the distance from a camera lens flange mounting ring to a camera film rail, it is understood that the measurement can be made between any first reference surface and any second reference surface in a camera each being defined by a minimum of 3 points to define their respective measurement planes. In addition, the object need not be a still camera. For example, a video film recorder, a laser scanning head, or a projector may be suitable objects with substantially similar reference surfaces for measurement.

When building a digital camera it is not necessary for the camera to include film rails. Any set of three points defining a reference plane can be utilized. The adjustable height measurement flat 20 would be adapted to mate to appropriate reference plane measurement locations.

Finally, cameras with different types of lens mounting rings 14 can be measured with the same fixturing by addition of a precision slide or a turret on the primary mounting base 10 which maintains a constant measured height when the lens mounting ring 14 is placed in the measurement zone. In this case, multiple camera mounting base cylinders 12 would be mounted on the top surface of the precision slide and could be placed under the camera measurement zone as required.

The invention has been described in detail with particular reference to certain preferred embodiments thereof, but it will be understood that variations and modifications can be effected within the spirit and scope of the invention.

PARTS LIST

| | |
|---|---|
| 5 | camera reference surface distance measuring system |
| 10 | primary mounting base |
| 12 | camera mounting base cylinder |
| 13 | measurement apparatus lens flange mounting surface |
| 14 | measurement apparatus lens mounting ring |
| 16 | main support |
| 18 | optical probe mounting base |
| 19 | alignment pin |
| 20 | adjustable height measurement flat |
| 21 | first planar parallel surface |
| 22 | tensioning spring |
| 23 | second planar parallel surface |
| 24 | optical probe integrated reference flat |
| 25 | optical probe |
| 26 | clamp |
| 27 | optical probe reference surface |
| 28 | optical probe chuck |
| 29 | measurement flat height adjustment rod |
| 30 | optical fiber |
| 31 | adjustment rod tip |
| 32 | optical interferometer |
| 33 | GRIN lens |
| 34 | computer |
| 35 | interferometer single mode fiber cable |
| 36 | optical multiplexer |
| 37 | data transmission cable |
| 38 | angled fiber tip |
| 39 | angled fiber ferrule |
| 48 | camera lens |
| 50 | camera body |
| 51 | lens flange mounting ring |
| 52 | second reference surface |
| 53 | first reference surface |
| 54 | camera alignment pin receiver hole |
| 55 | camera mounting reference structure |
| 56 | camera threaded hole |
| 57 | unlocking means |
| 58 | locking means |
| 59 | camera film rails |
| 60 | imager camera mounting plate |
| 62 | camera mounting plate reference surface |
| 64 | alignment pin |
| 66 | mounting hole |
| 68 | image sensor cutout |
| 70 | reference body |

What is claimed is:

1. An interferometric-based measurement system for externally measuring a distance between a pair of reference surfaces on an object, comprising:

a) a low coherence light interferometer;

b) an object mounting apparatus including an optical probe having an optical probe chuck;

c) an optical fiber cable for coupling light from the interferometer to the optical probe chuck; and d) a computer for processing data collected by the interferometer, wherein the data is used to determine the distance between the pair of reference surfaces on the object.

2. An interferometric-based measurement system for externally measuring a distance between a camera's first and second reference surface, comprising:

a) a low coherence light interferometer;

b) a camera mounting apparatus including an optical probe having an optical probe chuck;

c) an optical fiber cable for coupling light from the interferometer to the optical probe chuck; and d) a computer for processing data collected by the interferometer, wherein the data is used to determine the distance between a measurement camera's first and second reference surfaces.

3. The interferometric-based measurement system claimed in claim 2, wherein the optical fiber cable is input to an optical multiplexer, wherein an output from the optical multiplexer is coupled to each optical probe chuck.

4. An interferometric-based external measurement system for determining whether a distance between a measurement camera's lens flange mounting ring and a camera's second reference surface meets predetermined dimensional specifications, comprising:
 a) a low coherence light interferometer;
 b) a camera mounting apparatus, including an optical probe having an optical probe chuck;
 c) an optical fiber cable for coupling light from the interferometer to the optical probe chuck; and
 d) a computer for processing data collected by the interferometer, wherein the data is used to determine whether the predetermined dimensional specifications are met.

5. An interferometric external measurement apparatus for measuring a distance between a measurement camera's lens flange mounting ring and a camera's second reference surface, comprising:
 a) a primary mounting base;
 b) a camera mounting base cylinder with one end mounted to the primary mounting base and projecting perpendicular to the primary mounting base and having a measurement apparatus lens mounting ring attached to an opposite end of the camera mounting base cylinder, wherein the measurement apparatus lens mounting ring mates to a lens flange mounting ring of a camera body;
 c) a support structure having main supports attached to an optical probe mounting base;
 d) an optical probe including an optical probe chuck and an optical probe reference surface;
 e) an adjustable height measurement flat with a first planar parallel surface, for mating to a second reference surface of the camera, and a second planar parallel surface at a known distance from the first planar parallel surface, wherein the adjustable height measurement flat is attached to a plurality of spring-loaded tensioning rods;
 f) a plurality of clamps fixedly attached to the spring-loaded tensioning rods for facilitating mating the first planar parallel surface to the measurement camera's second reference surface;
 g) a low-coherence light interferometer;
 h) an optical fiber cable for coupling light from the interferometer to the optical probe chuck; and
 i) a computer for processing data collected by the interferometer, wherein the data is used to determine the distance between the measurement camera's lens flange mounting ring and the camera's second reference surface.

6. The apparatus claimed in claim 5, further comprising:
 a precision slide on the primary mounting base; and
 a plurality of camera mounting base cylinders with different types of camera lens flange mounting rings.

7. The apparatus claimed in claim 5, further comprising:
 a turret on the primary mounting base; and
 a plurality of camera mounting base cylinders with different types of camera lens flange mounting rings.

8. A method for externally calibrating an apparatus that measures a physical distance in a camera between a first reference surface on the camera and a second reference surface (LFu) on the camera, the first reference surface being substantially parallel to the second reference surface comprising the steps of:
 a) mounting the first reference surface of a reference camera with a known distance LFr onto a measurement apparatus that includes an optical probe with an optical probe reference surface R, and an adjustable height measurement flat;
 b) clamping to mate the adjustable height measurement flat to the second reference surface of the camera (F); and
 c) determining a distance RBr with a low-coherence light interferometer, where RBr is defined as the distance from the optical probe reference surface R to a second planar parallel surface of the adjustable height measurement flat (B).

9. A method for externally measuring a physical distance in a camera between a first reference surface on the camera and a second reference surface (LFu) on the camera, the first reference surface being substantially parallel to the second reference surface comprising the steps of:
 a) mounting the first reference surface of the camera RBu onto a measurement apparatus that includes an optical probe with an optical probe reference surface R, and an adjustable height measurement flat;
 b) clamping to mate the adjustable height measurement flat to the second reference surface of the camera (F);
 c) determining a distance RBu with a low-coherence light interferometer, where RBu is defined as the distance from the optical probe reference surface R to a second planar parallel surface of the adjustable height measurement flat (B); and
 d) calculating a distance LFu using the distance RBu and a predetermined RBr and LFr obtained from a known reference camera.

* * * * *